United States Patent Office 3,186,530
Patented June 1, 1965

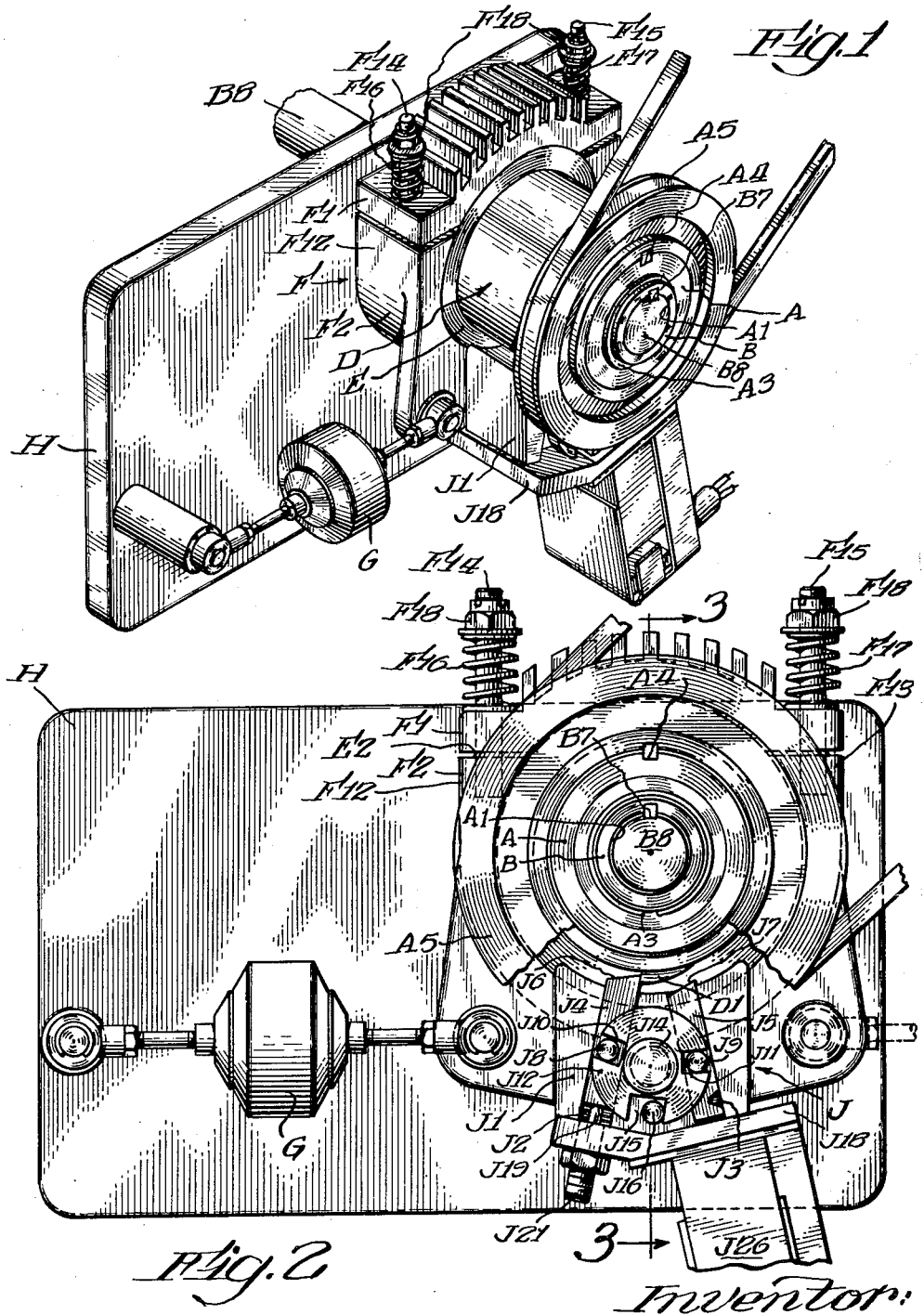

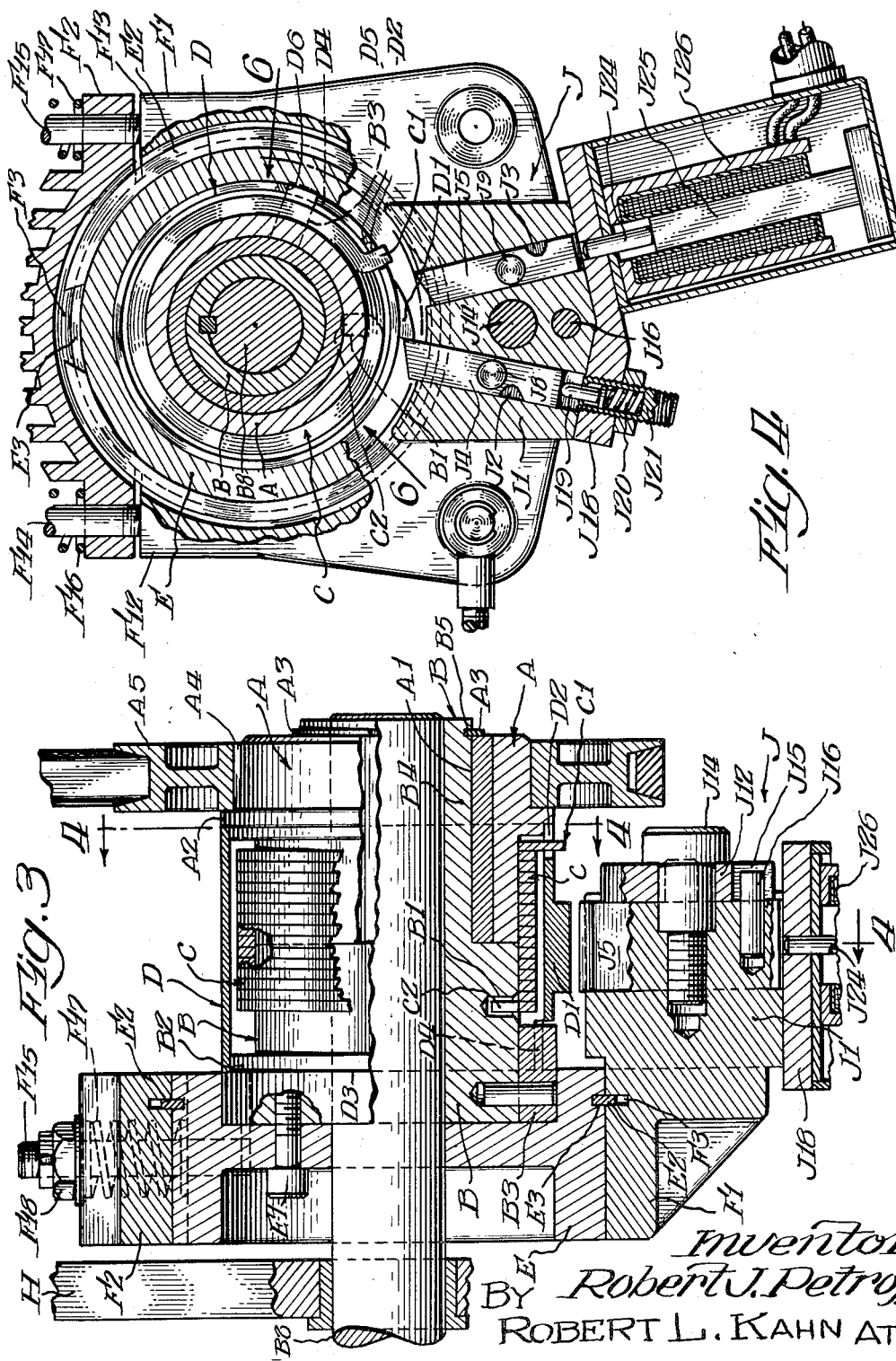

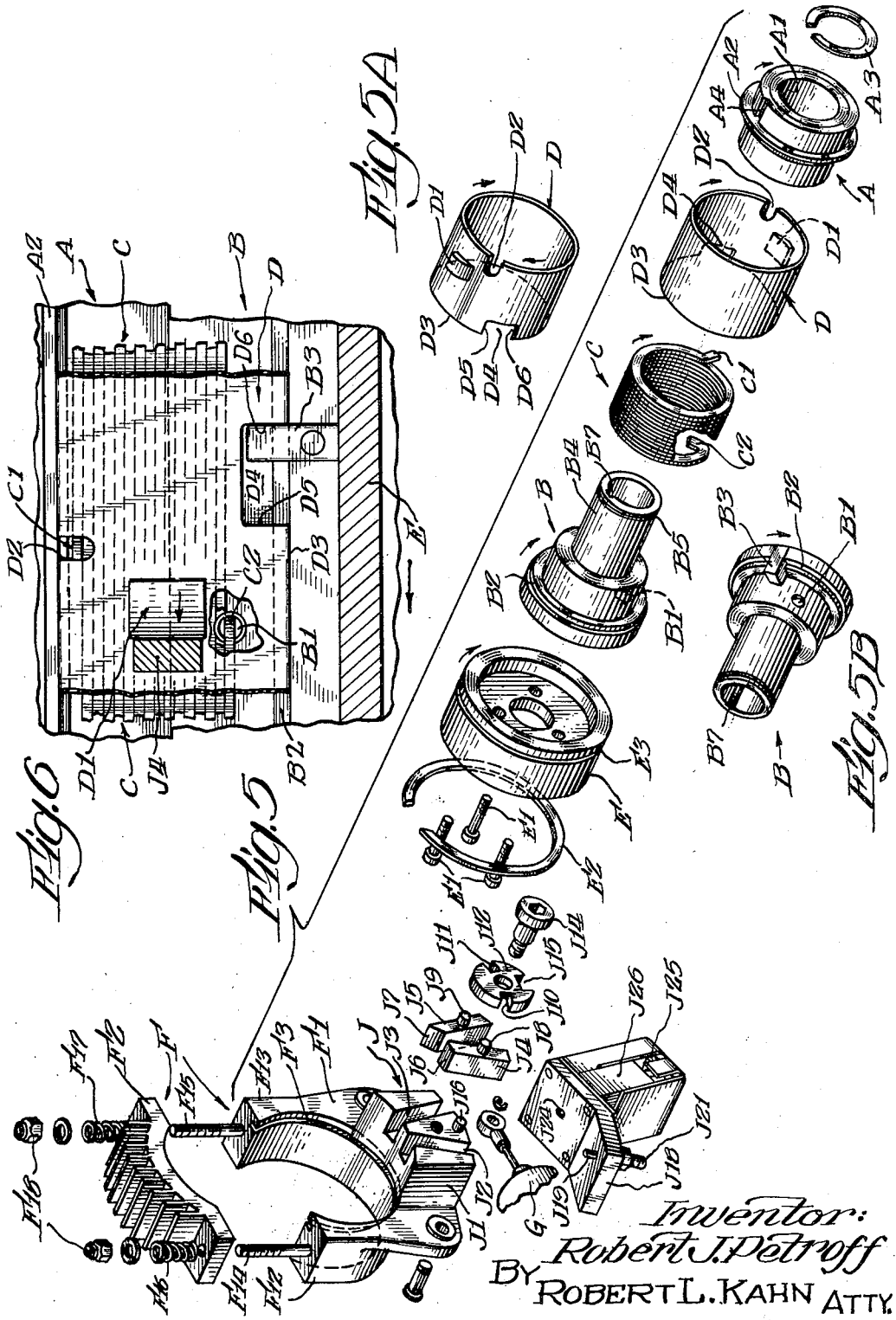

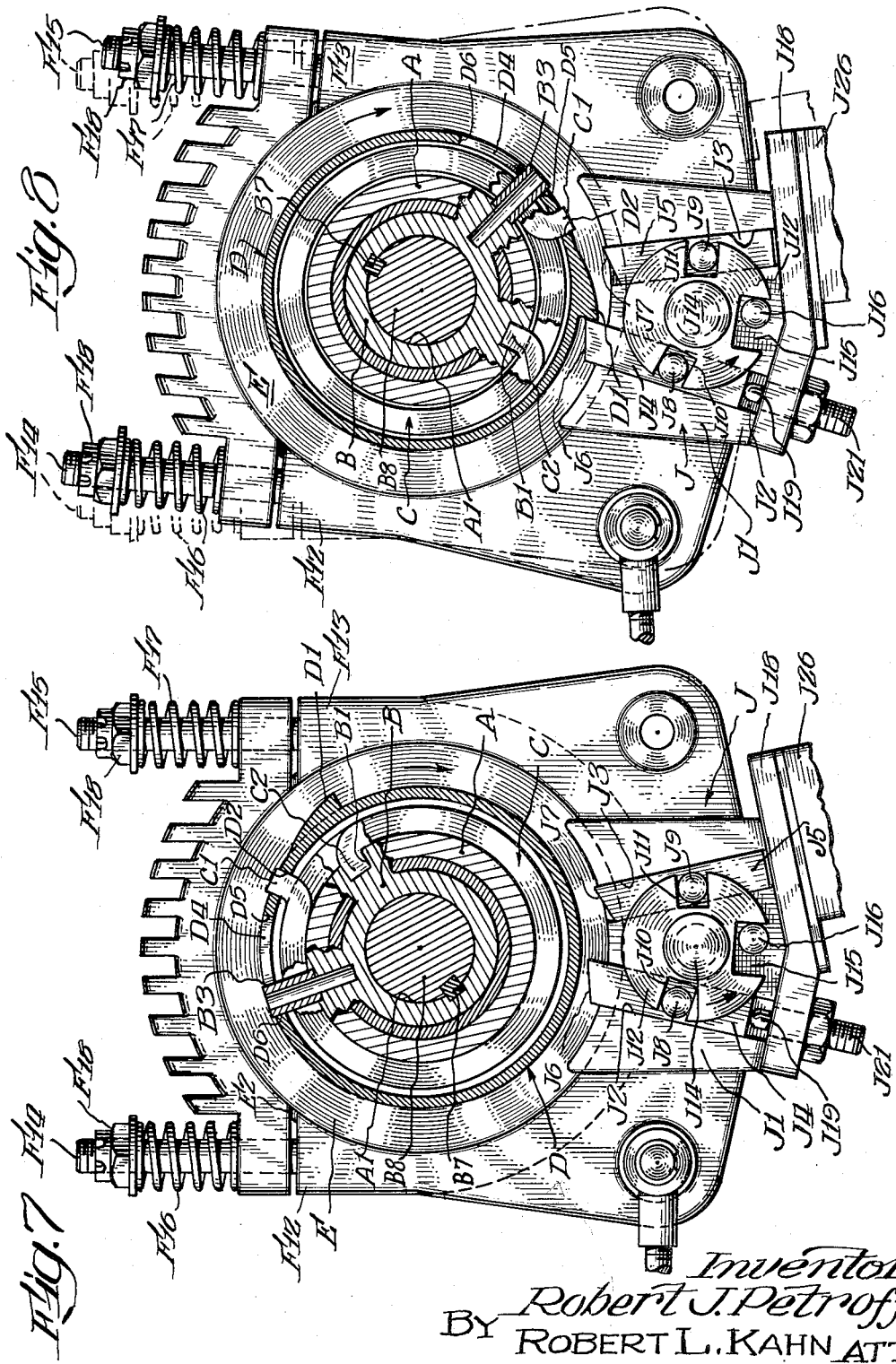

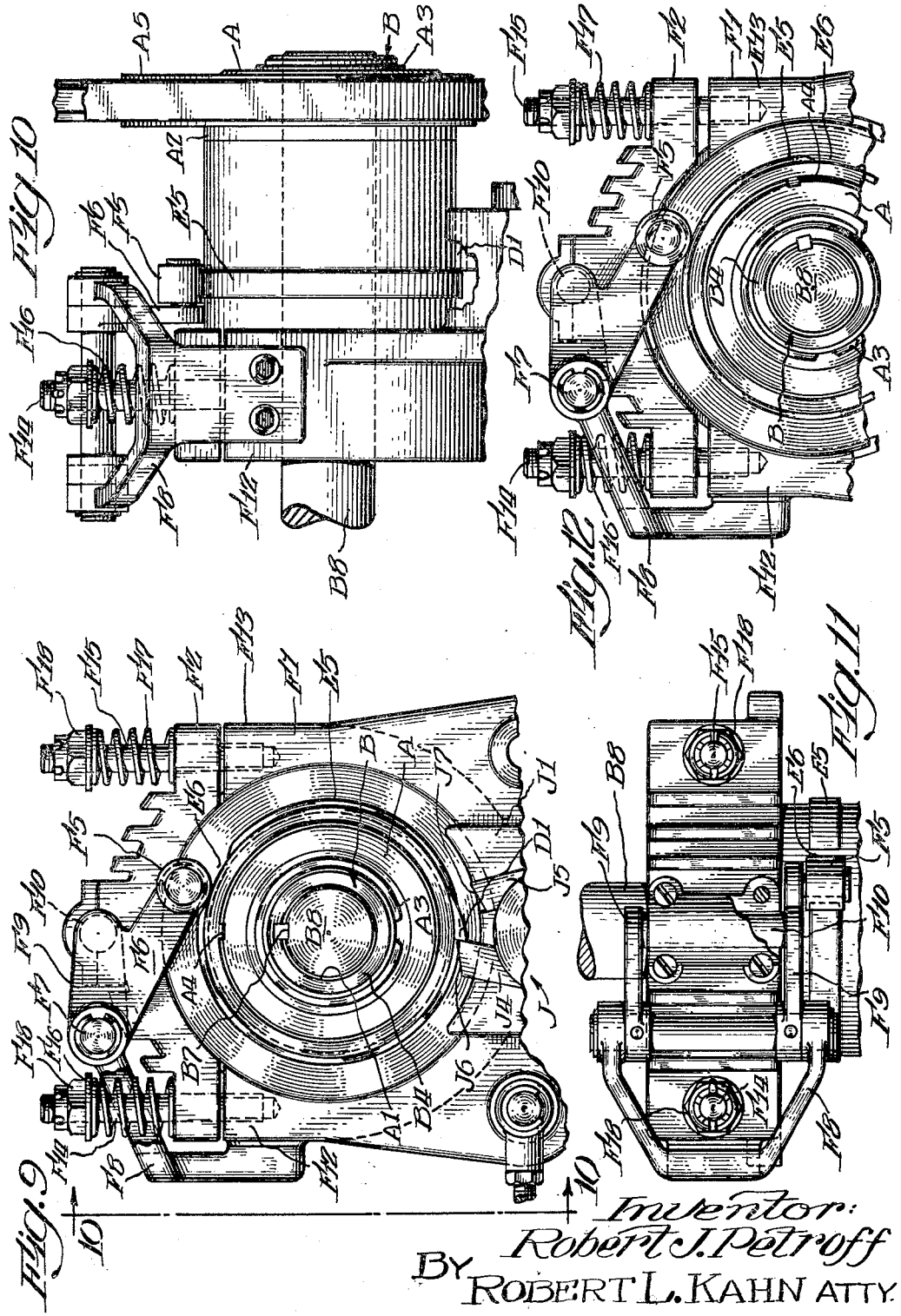

3,186,530
COIL SPRING CLUTCH WITH BRAKE
Robert J. Petroff, Lombard, Ill.
(% Petroff Association, 5101 W. Lake St., Chicago 4, Ill.)
Filed Dec. 26, 1962, Ser. No. 246,943
10 Claims. (Cl. 192—12)

This invention relates to a clutch with particular application to a one-revolution clutch of simple and compact construction combining the features of mechanical simplicity and economy of manufacture, with great advantages relating to control of acceleration and deceleration, control of maximum torque transmission coupled with positive fail-safe characteristics. A construction embodying the present invention has outstanding flexibility not only in regard to design, but also in regard to the amount of load which a particular embodiment can handle. The new construction hereinafter described is compact, mechanically simple and can be assembled and installed quickly and easily. Furthermore, it can be easily modified to make any desired number of complete turns of the driven member. The general clutch construction embodying the present invention is acceptable for use in a wide range of sizes and power.

One-revolution clutches are widely used in industry and should provide a power connecting means between a motor or other source of power operating continuously and a load which operates intermittently, such as the ram of a punch press, for example. Fundamentally, a one-revolution clutch requires not only a clutch for connecting the source of power with the load, but must also provide means for controlling the operation of the clutch so that a predetermined movement of the load, usually substantially one complete revolution or less, is obtained. As a rule, one-revolution clutches are subject to great stresses due to sudden coupling and uncoupling of a load to a rotating source of power. The failure of a one-revolution clutch in such applications as punch presses involves considerable danger to human beings, as well as the possibility of considerable damage. It is therefore a very important consideration in many one-revolution clutches that in case of failure, the clutch will assume a condition of fail-safe where the clutch is disconnected and will not permit the load to be operated by the source of power. It is also important that in case of overload, the clutch will limit the power or torque transmitted through it.

An important consideration in the design and operation of any clutch is the degree of acceleration of the load when the power is initially connected and the degree of deceleration of the load when the power is disconnected and the load is to be stopped in a predetermined position. Assuming that the power source in continuous operation has infinite energy—for minute increments of time, such an assumption is reasonable—then the stress to which various clutch parts are subjected can vary greatly depending upon how quickly these parts must accelerate to start from rest and reach full speed. As an example, if the period of acceleration can be doubled or tripled, then the stress to which these parts are subjected will be greatly reduced. The periods of time with which many one-revolution clutches are concerned, insofar as acceleration of the load or driven member is concerned, may be of the order of a fraction of one-thousandth (milli) second. Thus, increasing or multiplying such a period of acceleration (and deceleration) by 5 or 10 times will permit extremely fast starts (and stops) while greatly reducing stresses in various parts. By increasing the period of acceleration and deceleration, it is possible to increase the load capacity of the clutch without overstressing clutch parts.

This invention provides a construction which utilizes a helical coil spring as a clutch element between cylindrical driver and driven members. The amount of power which can be transmitted by such a clutch can, for the size of the clutch, be quite considerable. By controlling the gauge of spring, as well as the number of turns involved, a substantial control over the acceleration of the driven part with respect to the driver can be obtained. As will appear in connection with a detailed description of the structure embodying the present invention, the number of physical parts which must be operated and the amount of movement required is such that initiation of clutching or declutching is extremely fast in comparison to any other clutch.

Cooperating with the driven member of a helical coil spring clutch is an escapement mechanism which inherently has fail-safe operating characteristics. Associated with and controlling the operation of the driven member is a simple brake mechanism and a separate but cooperating shock absorbing mechanism. The shock absorbing mechanism can, if desired, be combined with the brake, but the function of the shock absorbing mechanism is entirely distinct. The shock absorbing mechanism provides an additional means for exercising a close control of the deceleration of the driven part at the end of a clutching cycle.

By virtue of the functioning of such a shock absorbing addition, it is possible to avoid tremendous stresses and strains in various mechanical parts incident to what would ordinarily be a quick start and a quick stop of the movement of such parts. The shock absorbing mechanism can be applied to any kind of a one-revolution clutch mechanism, as well as other start and stop clutches, with considerable improvement in the operation thereof. Likewise, the escapement means can also be applied to various kinds of one-revolution clutch mechanisms. However, the combination of a helical coil spring type of clutch with shock absorbing means is particularly effective and the effectiveness of this combination is further enhanced by the simplicity and positive operating characteristics of the escapement mechanism.

The invention generally involves a helical coil spring having both ends coupled to the driven clutch member and normally assuming a clutch engaging position on the driver and driven members. The driver end of the coil spring is substantially fixedly coupled to a detent part. The driven end of the spring is coupled to the driven member in such a manner that the driven end of the spring can be angularly moved or displaced relative to the driver end of the spring in a direction to uncoil or reverse tension the spring. The sudden stopping of the driver end of the spring by detent action, after clutch engagement has occurred, initiates spring uncoiling sufficient to cause clutch release or disengagement. The momentum of the clutch load together with the suddenness of the detent stop action both act on the driver end of the spring to effect clutch release. A friction brake, or other means, prevents the reverse-tensioned spring—the unwinding action stores energy in the coil spring—from relieving itself through the clutch driven member.

A full description of the embodiment of the invention will now be given in connection with the drawings wherein:

FIGURE 1 is a perspective view of the clutch system embodying the present invention.

FIGURE 2 is an elevation from the driver end of the mechanism illustrated in FIGURE 1, certain parts being broken away.

FIGURE 3 is a section along line 3—3 of FIGURE 2.

FIGURE 4 is a section along broken line 4—4 of FIGURE 3.

FIGURE 5 is an exploded perspective view of substantially all of the component parts of the mechanism illustrated in FIGURE 1.

FIGURES 5A and 5B are perspective views of two of the components of FIGURE 5, these two views showing these components turned to illustrate the structures thereof.

FIGURE 6 is an enlarged detail showing the relationship of certain parts of the mechanism in connection with stopping of the clutch.

FIGURE 7 is an elevation partly in section of the clutch system after clutch engagement has occurred.

FIGURE 8 is a view generally similar to FIGURE 7 but showing the clutch in the stopped position, the dotted lines illustrating the response of the clutch system to the shock of the sudden stop.

FIGURE 9 is an elevation from the driver end of the clutch system with the pulley removed, this view showing a modification for obtaining automatic brake control, the brake being in engaging or braking position.

FIGURE 10 is a view along line 10—10 of FIGURE 9, certain parts being broken away and the pulley being present.

FIGURE 11 is a top view of the modification illustrated in FIGURE 9, certain parts being omitted for simplicity.

FIGURE 12 is an elevation of the modification illustrated in FIGURE 9 with the brake control being in a brake-release position.

The structure embodying the present invention has driver cylindrical member A which is coaxial with driven cylindrical member B, both of whose outer surfaces cooperate with helical coil spring C. Coil spring C is preferably of rectangular wire so that the inside surface of the coil spring will have maximum contact with the outer cylindrical surfaces of members A and B. Helical coil spring C normally tends to grip the outer cylindrical surfaces of A and B and tends to establish a driving connection between them. During actual driving, there will be a tendency to wind the coils of spring C tighter. The direction of winding of spring C is such that driver member A, which will always go in one direction, here illustrated as clockwise, will tend to tighten the coils of the spring on A and B during clutch engagement.

For the purposes of this invention, it is important that the ends of coil spring C be controlled and, accordingly, spring C has driver end C1 in the form of a laterally extending hook portion extending radially away from the coil spring. Spring C has driven end C2, here illustrated as being bent inwardly to form a claw. Driven end C2 of the spring is rotatively locked to driven member B and, as illustrated here, this is accomplished by the simple expedient of having claw C2 enter recess B1 in driven member B. Other coupling means may be used, such as, for example, a pin extending outwardly from driven member B to engage a hookeye formed by the end of spring C. At any rate, the relationship between driven end C2 of spring C and driven member B is such that no substantial angular displacement can occur.

Driver end C1 of spring C is rotatively locked to part D1, which is part of a detent mechanism, to be described later. Detent part D1 is adapted to stop driver end C1 of the spring. The coupling between detent part D1 and driver end C1 of spring C may be accomplished by any desirable means. As illustrated here, this is accomplished by the simple expedient of metal sleeve D within which spring C is disposed. Detent part D1 is simply a ratchet tooth or block disposed on the outer surface of metal cylinder D. The coupling between detent tooth D1 and driver end C1 of spring C is accomplished by having slot D2 in the driver end of sleeve D. Spring end C1 is disposed in slot D2 of sleeve D.

The inside diameter of sleeve D, which functions as the barrel of spring C, is larger than the normal outside diameter of spring C to permit the diameter of the spring coils to increase for declutching. Sleeve D has end portion D3, which is the driven end of this sleeve, small enough so that it can go over and be supported by cylindrical portion B2 forming part of driven member B. Extending radially outwardly from driven member B is dog B3 which works in arcuate slot D4 in edge D3 of sleeve D. The angular extent of slot D4 is larger than that of dog B3 so that some relative angular travel between sleeve D and driven member B is possible. Dog B3 will limit the angular displacement between sleeve D and driven member B when it encounters edges D5 and D6 of slot D4.

The angular orientation of slot D4 with reference to slot D2 for the driver end of the spring is important in terms of the angular orientation between the driver and driven ends of coil spring C. The orientation is such that when dog B3 is against leading edge D5 of slot D4, driven spring end C2 will be angularly displaced with reference to end C1 in a direction to unwind or reverse tension spring C and thus tend to increase the diameter of the coils of this spring. This will result in a declutching action between A and B. The orientation for a driving connection has dog B3 near trailing edge D6 of the slot, which permits driven end C2 of spring C to assume its normal orientation with the coils of the spring tightly gripping A and B for clutch engagement.

The angular range of travel of dog B3 in slot D4 as a rule need not be great in actual practice and may be as small as several degrees. The angular extent of slot D4 will vary depending upon clutch applications. The travel of dog B3 in slot D4 permits the driven part (and load) to coast after disengagement of the clutch spring. The brake acts during this coasting. As is well known in this type of coupling, a slight enlargement of the coils of a spring is sufficient to break the driving connection and conversely a slight tightening of one or more coils will suffice to initiate a tightening up of all of the coils to create a driving connection. Inasmuch as spring C is rotatively locked at C2 to driven member B, the tightening of the coils around the outside of B is not critical to establish a driving connection. However, this tightening on the driven member is desirable to reduce the strains in connection with starting which might ordinarily be impressed up claw end C2 of the spring. Because the spring tends to tighten when clutch engagement occurs, the function of trailing edge D6 of the sleeve slot is unimportant. To be sure that spring C tightens completely, trailing edge D6 can be located well beyond the theoretical position so that when spring C is fully contracted, dog B3 can still be short of slot edge D6.

Insofar as drive member A is concerned, it is essential that coil spring C establish a driving connection in normal spring condition and release when reverse-tensioned to permit slipping between the coils of the spring and driver member A. When the load, consisting of driven member B and other parts associated therewith is at rest, spring C is in a reverse-tensioned condition, D1 being held against a detent and B3 being held against edge D5, with driver member A rotating continuously.

The operation of the clutch mechanism involves the positioning of a detent block to be described later, in the path of travel of detent tooth D1 for the purpose of stopping rotation of driver end C1 of spring C. When this occurs, it is as if the direction of flow of power (normally from A toward B) is reversed with C1 tending to turn anti-clockwise with respect to A. This starts to unwind C beginning with C1 and breaks the driving connection between A and C. Driven part B together with its entire load, which may consist of the ram of a punch press or the like, will have sufficient momentum so that driven member B will over-travel the position of arrested detent tooth D1 and start to unwind driven end C2 of spring C. At the same time, dog B3 will move in slot D4 away from trailing edge D6 and will advance toward leading edge D5 of sleeve D. Dog B3 will be limited in its travel while the driven end turn of spring C is being unwound and the entire spring C is being reverse-tensioned. Driven member B and its load will come to rest in a position where dog B3 will be against edge D5. The design of the various parts is such that the entire driven member and load will be decelerated and stop. It is possible for spring C to be strong enough and braking be such as to resist reverse tensioning sufficiently so that dog B3 will not reach edge D5.

After the parts have come to rest, the coils of spring C will be reverse-tensioned. Unless preventive means are provided, spring C can relieve itself by operating on driven part B. This is because the spring normally tends to provide a driving connection between members A and B. This tendency of driven part B to slip back must be resisted and, accordingly, means are provided acting on the driven member or on any part coupled thereto to prevent any such motion. The means should exert sufficient restraint so that the tensioned condition of spring C on reverse tension is not sufficient to cause driven part B or its load to creep. While a load itself may have sufficient friction, it is preferred to provide definite friction means here illustrated as a friction brake.

Driven member B is rigidly coupled by bolts E1 to brake drum E which operates in brake bands F of the contracting type. Brake bands F, consisting of the parts to be described later, must be restrained from complete rotation but is mounted in such a manner as to permit of a limited degree of angular motion. As an example, brake band F1 is pivotally secured at F2 to shock absorber G which itself is secured to a stationary structure, illustrated as H. As will be explained later, brake band F1 can have as many shock absorbers mounted as may be desired, it being understood that brake band F1 is capable of some rotational oscillation about the axis of brake drum E. Brake band F2 cooperates with band F1 to brake drum E. The mounting details of band part F2 will be given later.

Brake band F1 as a generally stationary means can carry detent mechanism generally indicated by J, which cooperates with detent tooth D1 of sleeve D.

It is understood that the brake mechanism may be any one of a number of types, friction or electromagnetic, and the detent mechanism may also be any one of a number of types. However, the brake construction here illustrated and the detent means illustrated and to be described are particularly desirable and not only cooperate to provide a compact overall clutch structure, but insofar as the detent mechanism is concerned, provide a safe construction which can not possibly fail under any conditions. The brake construction is here illustrated as carrying the detent structure, although this is not essential. The detent structure which is preferred and which is illustrated is of an escapement type having the desirable characteristics of providing a positive stop against more than one turn of the driven member irrespective of the condition of the detent mechanism and irrespective of the manner in which it is operated or fails to operate. Such a characteristic is particularly important on machines where serious damage and possible injury, as well as loss of life, may result in the event of a failure of the detent mechanism to function. In the clutch structure here, in case of failure involving the absolute stopping of the driven part by a detent block, it is possible that coil spring C may slip.

The driver and driven members A and B are maintained in bearing relation by reduced sleeve portion B4 extending from driven member B and passing through bore A1 of driver A. External flange A2 on driver A will ride against the driving edge of sleeve D and lock driving end C1 of the coil spring in edge slot D2 of sleeve D. The driver-driven member assembly is retained by spring ring A3 locking in slot B5 at the free end of reduced sleeve portion B4.

Driver member A has keyway A4 which cooperates with a keyway in pulley A5 to receive a key. Driven member B has an internal keyway B7 for keying to driven shaft B8.

Brake drum part E is locked to the brake bands by spring ring E2 riding in slots E3 and F3 of the brake drum and band. Brake drum E should be restrained by brake bands when the clutch has reached a stopping position and must thereafter be restrained until the clutch is released for a succeeding operation. Brake band portions F1 and F2 can be tight against brake drum E at all times even though some power would be wasted during rotation of the brake drum when the clutch is engaged.

Top band portion F2 is provided with heat radiating fins. The two brake band parts F1 and F2 may be made from one integral block cut-out to accommodate brake drum E. Then the original block can be sawed to provide parts F1 and F2. The two blocks F1 and F2 will have metal corresponding to the thickness of the saw blade removed, permitting blocks F1 and F2 to be tight on drum E.

Referring now to the detent-escapement part of the mechanism, the entire assembly, generally indicated by J, has base J1 which is here illustrated as being integral with brake portion F1 and is disposed on that side of the brake portion facing the clutch mechanism generally. Base J1 has slots J2 and J3 provided therein, these slots being disposed generally radially of the rotating portion of the clutch assembly. Slidably disposed in these two slots are detent blocks J4 and J5 whose ends J6 and J7 have sloping faces for cooperating with tooth D1 disposed upon the outside of barrel D. The exact shape of detent block ends J6 and J7 is not too important, since the mechanism is supposed to turn only in one direction, this being clockwise as seen from the driver end of the mechanism in the arrangement illustrated.

Means are provided for coupling and operating blocks J4 and J5 so that only one of the two blocks can be in a position for engaging tooth D1. This coupling means is accomplished by pins J8 and J9 laterally extending from blocks J4 and J5 respectively. Pins J8 and J9 work in slots J10 and J11 in rocker block J12 pivotally secured upon base J1 by pivot bolt J14. Rocker block J12 is provided with slot J15 which cooperates with pin J16 carrier by base J1 for limiting the rocking motion of the rocker block. These limits are set so that rocker block J12 can rock between two positions where one or the other detent blocks J4 or J5 is in stopping position with respect to tooth D1.

The bottom of base J1 carries yoke J18. Yoke J18 may be bolted or otherwise secured to base J1. Yoke J18 carries at one part thereof pin J19 which is longitudinally movable in slot J2 of base J1 and is useful for cooperating with detent block J4 to impart movement thereto at least in one direction. Pin J19 is spring pressed upwardly, as seen in FIGURE 4 for example, by coil spring J20 carried by cup J21 threaded into the yoke. In the normal operating position of the entire mechanism, pin J19 urges detent block J4 upwardly in active position as illustrated in FIGURE 4.

Yoke J18 carries pin J24 which is adapted to cooperate with detent block J5. Pin J24 is coupled or secured to armature J25 which is longitudinally movable in solenoid J26. When the winding of solenoid J26 is energized, armature J25 is attracted upwardly from the position shown in FIGURE 4 and pin J24 forces detent block J5 upwardly into active position for engagement with tooth D1. At the same time, when detent block J5 is moved upwardly as seen in FIGURE 4, detent block J4 is moved downwardly against the bias force exerted by spring 20. It is understood that solenoid J26 when energized should have sufficient power to cause the movement of the two detent blocks. In the event that solenoid J26 is deenergized, then the bias of coil spring 20 will restore the parts to the normal position illustrated in FIGURE 4.

Rocker block J12 is sufficiently large so that it overlays a substantial portion of detent blocks J5 and J4 and thus maintains the detent blocks in position within the slots of base J1.

In the event that the mechanism is to be used for clutch control generally as distinguished from one-revolution operation, it is only necessary to shorten detent block J5 to remove end J7 as a stopping means.

Referring now to FIGURES 9 to 12 inclusive, a modification is illustrated wherein cam means are provided for brake release when not needed.

Brake drum E is provided with brake control cam E5 having cam drop portion E6. This cam drop portion will control the tightening of the brake bands about drum E.

The angular extent of cam drop E6 should be enough to cause braking action just before clutch engagement and release the brake just after the clutch has engaged and turned drum E through a short angle. Cooperating with cam E5 is cam follower F5 carried by rocker arm F6 pivotally supported on pin F7 carried by arm F8 rigidly attached to lower brake band portion F1. Arm F9 is rigidly secured to arm F6 and arm F9 is pivotally secured at F10 to top brake band portion F2. Brake band portion F2 has its ends F12 and F13 apertured to accommodate studs F14 and F15 extending upwardly from the ends of brake band portion F1. Coil springs F16 and F17 and nuts F18 on the studs act to press top brake band portion F2 against brake band portion F1 to make the brake bands tight on drum E. However, cam E5 will force follower F5 to loosen the top brake band portion F2.

The invention provides a compact unitary construction wherein all the elements of a clutch, together with detent means, brake means and control means for the detent are in one assembly. The entire assembly is convenient in having the detent mechanism and normally non-rotatable parts of the brake rockable about the center of the axis of the entire mechanism. The entire means comprising the escapement, together with the operating mechanism for the escapement, and the like, is self contained and does not require any special mounting. Shock absorber means must be secured to some stationary support. The shock absorber means can be secured to one or any number of regions on the non-rotatable part of the system, here illustrated by the large plate carrying the brake band portions and detent base J1. Otherwise, the entire clutch is a unit which can be coupled on the one hand to a source of power, which in this particular instance is a pulley, and on the other hand to a load, which in this particular instance is represented by a shaft.

In FIGURE 8 for example, the drawing shows how the clutch system responds to the shock of sudden stoppage of the driven part. The brake band and detent base are rocked to the dotted line position, the amount of rocking illustrated being greater than would normally occur in practice. The shock absorber means may be one or more units coupled at various regions about the center of brake drum rotation. These shock absorber units may be of any type. Whether a shock absorber unit absorbs energy or merely stores it is immaterial. If the unit merely absorbs energy, it will not restore the rockable parts to their original stopping position. On starting up when clutch engagement occurs, the shock absorber will then restore everything to normal.

The arrangement of the various clutch parts with respect to each other is convenient in that one part functions as a bearing for another part. Thus for example, driver A and driven part B have such a bearing relationship with respect to each other and to the output shaft. Because of this, the entire assembly is easily secured in position, with a minimum of alteration of the environment in which the device is to operate.

What is claimed is:

1. A clutch system comprising, a cylindrical driver member for rotation in one direction, a cylindrical driven member, means for mounting said two members in axial alinement, a helical coil spring disposed over said two members for clutch action and normally gripping said two member cylindrical surfaces with the direction of spring wind tending to tighten the spring coils when said driver member is rotating said driven member, said spring having one end at the driver member and having the other end at the driven member, means for locking said other spring end to said driven member against relative rotation between the two, detent means laterally offset from the alined cylinder axes and supported for rotary movement about said aligned axes over a small limited angle and including a manual control, a detent stop for cooperation with said detent means and secured to rotate with said one spring end, means for coupling said one spring end to said driven member to provide some angular displacement between the two spring ends, the angular displacement being sufficient and oriented with respect to the one spring end that said other spring end can be moved in a direction toward uncoiling said spring from its normal clutch engaging position and reverse-tension said spring to a clutch disengaging position, said small limited angle of detent rotary movement being large enough to accommodate the uncoiling spring movement and said driven member being adapted to be coupled to a load having sufficient moment of inertia to cause said driven member to turn beyond the stopping position of said one spring end as the result of detent action after a clutch engaging operation, and effect sufficient reverse tensioning of said spring to cause clutch disengagement, a brake drum rotatively secured to said driven member, and brake bands cooperating with said brake drum and anchored to prevent substantial rotation with the brake drum when operating, said brake means comprising a means operating on said driven member to prevent said reversely tensioned spring from relieving itself through creepage of said driven member whereby upon detent release, said reversely tensioned spring relieves itself by moving said one spring end and detent stop to effect clutch engagement and rotation of said spring and driven member until a succeeding detent stop action occurs.

2. The construction according to claim 1 wherein shock absorbing means between said brake bands and a stationary point are provided, said shock absorbing means acting at the beginning and end of a clutch engaging cycle.

3. The construction according to claim 1 wherein said detent means and brake bands are secured together for any rotary movement about the alined cylinder axes.

4. A clutch system comprising, a cylindrical driver member for rotation in one direction, a cylindrical driven member, means for mounting said two members in axial alinement, a helical coil spring disposed over said two members for clutch action and normally gripping said two member cylindrical surfaces with the direction of spring wind tending to tighten the spring coils when said driver member is rotating said driven member, said spring having one end at the driver member and having the other end at the driven member, means for locking said other spring end to said driven member against relative rotation between the two, detent means, a detent stop for cooperation with said detent means and secured to rotate with said one spring end, means for coupling said one spring end to said driven member to provide some angular displacement between the two spring ends, the angular displacement being sufficient and oriented with respect to the one spring end that said other spring end can be moved in a direction toward uncoiling said spring from its normal clutch engaging position and reverse-tension said spring to a clutch disengaging position, said driven member being adapted to be coupled to a load having sufficient moment of inertia to cause said driven member to turn beyond the stopping position of said one spring end as the result of detent action after a clutch engaging operation, and effect sufficient reverse tensioning of said spring to cause clutch disengagement, braking means for said driven member including a relatively stationary member, means for mounting said detent means on said braking stationary member, said detent means including a block having slots generally radial of the axis of rotation of said clutch, a detent in each slot, each detent being movable in its slot from an inoperative position to an operative position where it is in the path of travel of said detent stop, means for interlocking said detents so that there is always a detent in operative position, the first of the two detents in the direction of driver rotation being the leading detent, and means for normally biasing said interlocked detents so that the trailing detent is in operating position, said braking means operating on said driven member to prevent said reversely tensioned spring from relieving itself through creepage of said driven member and means for moving said trailing detent against its bias to a detent release position long enough to permit said detent stop to pass by after which said trailing detent responds to its bias whereby upon detent release, said reversely tensioned spring relieves itself by moving said one spring end and detent stop to effect clutch engagement and rotation of said spring and driven member until a succeeding detent stop action occurs.

5. The construction according to claim 4 wherein said relatively stationary braking member has shock absorbing means for securing it to a stationary point, said relatively stationary braking member being otherwise free of any support on any stationary means and being able to move a limited amount about the axis of clutch rotation at least in response to the shock incident to clutch release or stopping.

6. The construction according to claim 5 wherein said braking means comprises a brake drum coupled to said driven member and brake bands around said drum, said bands including means for tightening said bands about said drum, said bands constituting the relatively stationary member.

7. The construction according to claim 6 wherein said brake bands comprise two arcuate portions on opposite sides of the drum, one such portion carrying the detent block and the remaining portion having heat radiating fins.

8. Clutch means comprising a cylindrical driver member, a cylindrical driven member, said two cylindrical members being of equal diameter, one of said two cylindrical members having a cylindrical extension of smaller diameter than the driven and driver members, said cylindrical extension being adapted to extend into and provide a bearing surface for the interior of the other cylindrical member, a helical coil spring disposed over said two cylindrical driver and driven members, a sleeve disposed over said helical coil spring and having an inside diameter somewhat larger than the outside diameter of said coil spring, the driver end of said sleeve having means for engaging the driver end of said coil spring, means for coupling the driven end of said spring to said driven cylindrical member, means on the driven end of said sleeve cooperating with means on said driven member to provide a limited degree of angular motion therebetween, a brake drum rigidly secured to said driven member to rotate therewith, brake band means disposed around said brake drum, a detent tooth carried by said sleeve on the outside thereof, detent means rigidly secured to said brake band means and movable to cooperate with said detent tooth for stopping rotation of said sleeve, manual control means for said detent means, means for securing said brake band means to permit a limited amount of rotary movement of said brake band means around the axis of said brake drum and an output shaft coupled to said driven part and supported in said cylindrical extension.

9. The construction according to claim 8 wherein said detent means comprises a detent base having two slots angularly separated from each other and disposed generally radially of the axis of the brake drum, a pair of detent blocks slidable in said slots, each detent block when in proper position being adapted to engage the detent tooth on the outside of said sleeve, rocker means coupling said two detent blocks so that as one detent block moves in other, one must move out, means for limiting the range of travel of said rocker means and control means for selectively operating said detent blocks to determine which of the two blocks shall be in operative position for stopping said sleeve, the angular separation between said blocks providing one-revolution clutch operation.

10. The construction according to claim 9 wherein means are provided for biasing one of said two detent blocks to an active detent tooth stopping position and wherein control means are provided for moving the other detent block into active detent tooth engaging position.

References Cited by the Examiner
UNITED STATES PATENTS

| | | | |
|---|---|---|---|
| 958,290 | 5/10 | Plant | 192—149 |
| 1,429,404 | 9/22 | Card | 192—149 |
| 1,528,637 | 3/25 | Swift | 192—149 |
| 2,829,748 | 4/58 | Sacchini et al. | 192—26 |
| 3,004,646 | 10/61 | Seiden. | |
| 3,087,587 | 4/63 | Flieg | 192—26 |

FOREIGN PATENTS

| | | |
|---|---|---|
| 402,576 | 5/10 | Germany. |

DAVID J. WILLIAMOWSKY, *Primary Examiner.*